United States Patent [19]

Dellbrugge

[11] Patent Number: 4,634,358
[45] Date of Patent: Jan. 6, 1987

[54] APPARATUS FOR FLATTENING AND WITHDRAWING BLOWN CONTINUOUS PLASTIC TUBULAR FILMS

[75] Inventor: Herbert Dellbrugge, Lengerich, Fed. Rep. of Germany

[73] Assignee: Windmoller & Holscher, Lengerich, Fed. Rep. of Germany

[21] Appl. No.: 838,345

[22] Filed: Mar. 11, 1986

[30] Foreign Application Priority Data

Mar. 11, 1985 [DE] Fed. Rep. of Germany ....... 3508626

[51] Int. Cl.$^4$ .............................................. B29C 53/20
[52] U.S. Cl. ............................... 425/72 R; 264/209.2; 264/564; 425/183; 425/186; 425/326.1; 425/387.1; 425/392
[58] Field of Search ...................... 425/72 R, 186, 188, 425/327, 326.1, 183, 387.1, 366, 392, 325; 264/209.2, 209.3, 209.4, 209.5, 562–569

[56] References Cited

U.S. PATENT DOCUMENTS

| | | | |
|---|---|---|---|
| Re. 29,043 | 11/1976 | Naito | 264/569 X |
| 2,844,846 | 7/1958 | Kronholm | 425/72 R |
| 3,632,265 | 1/1972 | Upmeier et al. | 425/326.1 |
| 3,687,585 | 8/1972 | Takagi | 264/567 X |
| 3,768,949 | 10/1973 | Upmeier | 425/392 |
| 3,804,572 | 4/1974 | Upmeier | 425/72 R X |
| 3,860,380 | 1/1975 | Upmeier | 425/326.1 |
| 3,993,723 | 11/1976 | Davis et al. | 425/326.1 X |
| 4,061,707 | 12/1977 | Nohtomi et al. | 264/566 |
| 4,138,453 | 2/1979 | Segl, Jr. | 425/326.1 X |
| 4,246,212 | 1/1981 | Upmeier et al. | 264/564 X |

*Primary Examiner*—Richard L. Chiesa
*Attorney, Agent, or Firm*—Fleit, Jacobson, Cohn & Price

[57] ABSTRACT

Apparatus for flattening and withdrawing blown continuous plastic tubular film issuing from a stationary film-blowing head. At least two deflecting rollers are provided for deflecting the tubular film through about 180°, and at least two turning rods are also provided for deflecting the tubular film through about 180° and for effecting a simultaneous change in direction. The deflecting rollers and turning rods are disposed in alternation behind each other between squeeze rolls and a pair of rotatable feed rolls, and are mounted on supports which are pivotally movable relative to each other in side arms that include track grooves to permit the deflecting rollers and turning rods to be movable in inward and outward directions, relative to the axis of rotation of the flattening plates, and are adapted to be retained in their inner and outer positions. The deflecting rollers and turning rods are initially at opposite ends of their respective track grooves for start up purposes. A pair of laterally spaced reels having threading tape wound thereon and extending therebetween are positioned vertically above the laterally spaced deflecting rollers and turning rods and are releasable so that one reel can pass therebetween when the apparatus is in the startup position, and so that the leading edge of the film can be attached to the threading tape for threading between the respective deflecting rolls and turning rods. After threading of the film, the deflecting rollers and turning rods are moved transversely along the grooves and in opposite directions to deflect the film through respective 180° turns.

8 Claims, 4 Drawing Figures

APPARATUS FOR FLATTENING AND WITHDRAWING BLOWN CONTINUOUS PLASTIC TUBULAR FILMS

BACKGROUND OF THE INVENTION

1. Field of the Invention

This invention relates to apparatus for flattening and withdrawing blown continuous plastic tubular films made by means of a stationary film-blowing head, and more particularly to apparatus that includes flattening plates and squeeze rolls, pivotally movable in mutually opposite senses through at least approximately 360 degrees about the axis of the tubular film, and that permits easier threading of the leading edge of the tubular film upon start up of the film blowing operation.

2. Description of the Prior Art

U.S. Pat. No. 3,768,949 discloses apparatus which serves to spread thicker portions in a tubular film in that the film is wound up like a rope so that cylindrical rolls of film can be formed. In the operation of the known apparatus it is rather difficult after starting the film-blowing plant to thread the leading end of the extruded tubular film between the squeeze rolls and then along a zigzag path between the deflecting rollers and the turning rods, and also between the feed rolls to the winding apparatus. That threading operation requires considerable operator skill because the tubular film that continuously emerges from the annular extrusion die initially has a molten and subsequently a soft plastic consistency and tends to stick.

It is an object of the invention to provide a flattening and take-off apparatus which permits the leading end of the extruded tubular film to be threaded more easily through the apparatus when the film-blowing plant has been started.

SUMMARY OF THE INVENTION

Briefly stated, in accordance with one aspect of the present invention that object is accomplished in accordance with the invention in that pivotal supports include side arms, which are approximately equal in length, deflecting rollers and turning rods are mounted in an extend between the arms, and the deflecting rollers and turning rods are slidable in tracks in the side arms in inward and outward directions and are adapted to be locked in their inner and outer positions. Before the film-blowing plant is started, the deflecting rolls of the apparatus in accordance with the invention are moved inwardly and the turning rods are moved outwardly, relative to the pivot axis of the side arms and flattening plates, so that the leading end of the extruded tubular film can be moved on a straight line between the pair of deflecting rollers and the pair of turning rods. When the tubular film has been threaded between the squeeze rolls and in the described manner between the deflecting rolls and the turning rods, and subsequently between the feed rolls to the winding apparauts, the turning rods are moved inwardly and the deflecting rollers are moved outwardly before the reversing winding operation is started. As a result, the turning rods and the deflecting rollers pull the tubular film between them to provide a zigzag path of movement of the film. The reversing winding operation can be initiated as soon as the threading operation has been completed. The apparatus in accordance with the invention not only greatly facilitates the threading of the leading end of the tubular film but also reduces to a substantial degree the quantity of waste which is otherwise obtained.

Drive means, such as screw mechanisms, may be provided for displacing the deflecting rollers and the turning rods or the associated bearings or mountings in the tracks.

The mountings for the uppermost turning rod are suitably provided with pivotal levers, and a guide roller may be rotatably mounted in and may extend between the free end portions of the levers. Such a guide roller will reduce the friction of the tubular film, which would otherwise be pulled around the turning rod. When the tubular film has been threaded, the guide roller may be pivotally moved to an inoperative inner position between the side arms before the turning rod is moved back to its operating inner position.

Apparatus according to the invention can include at least two deflecting rollers for deflecting the tubular film through about 180° and for effecting a simultaneous change in direction. The deflecting rollers and turning rods are disposed in alternation behind each other between the flattening plates and squeeze rolls, on the one hand, and a pair of rotatable feed rolls, on the other hand, and are mounted on supports that are pivotally movable relative to each other about the axis of the tubular film, which is also the axis of rotation for the flattening plates. The axes of the deflecting rollers and of the turning rods are tangent to circles described about the axis of rotation of the flattening plates, and the deflecting rolls are disposed in their operating positions laterally outwardly of the turning rods which are wrapped by the tubular film. The angles through which the axes of the deflecting rolls and of the turning rods are pivotally movable decreases as the distance from the feed rolls increases, and the tubular film extends between the deflecting rollers and the turning rods and from those rollers and rods to the pair of rotatable feed rolls, in mutually parallel planes, which are at right angles to the axis of rotation of the flattening plates.

In an embodiment of the invention, when in the starting position, the machine frame carries above the deflecting rollers and traversing rods a first reel disposed in a vertical plane that lies between the deflecting rollers and the traversing rods and a second reel that lies in a vertical plane on that side of the feed rolls which is opposite to the deflecting rollers and the traversing rods. The first and second reels are detachably mounted so that they can be released, and threading tapes are wound up on the reels and extend between the reels. Before the plant is started, the innermost reel, relative to the axis of the tubular film, is released to drop between the turning rods, which have been moved outwardly, and the deflecting rollers, which have been moved inwardly, and can be conveyed to the gap between the squeeze rolls so that the adjacent end portion of the threading tape can be joined to the leading end of the tubular film immediately after that end has been extruded. The other reel is released to drop onto the floor outwardly of the frame and adjacent to the winding apparatus so that the leading end of the extruded tubular film can then be threaded simply through the apparatus by pulling on the threading tape. If desired, a number of reels may be releasably mounted in each of two cassettelike magazines.

One of the squeeze rolls is suitably movable away from the other so that a reel can be moved in a simple manner between the squeeze rolls.

In accordance with another aspect of the invention, a ramplike plate extending toward the gap between the squeeze rolls is disposed below the innermost reel, which is disposed above and between the deflecting rolls and the turning rods, to receive the innermost reel when it is released, and a slide for moving the released innermost reel to the gap between the squeeze rolls is guided on said plate. The slide is suitably provided with side walls so that it constitutes a receiving hopper, and it can be used to further simplify the threading operation because the need for a manual threading of the threading tape between the squeeze rolls is eliminated.

DETAILED DESCRIPTION OF THE PREFERRED EMBODIMENT

An illustrative embodiment of the invention will now be explained in more detail with reference to the drawings.

Figure 1:
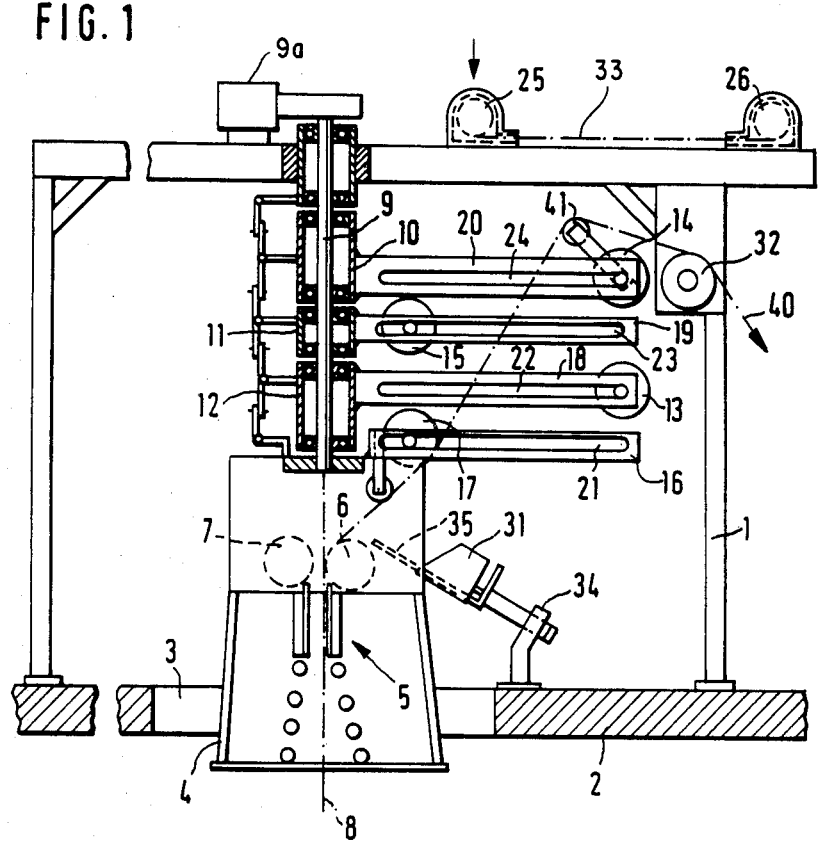
FIG. 1 is a diagrammatic side elevation showing a reversing flattening and take-off apparatus with deflecting rollers and turning rods in accordance with the present invention and when in a starting position.
Figure 2:
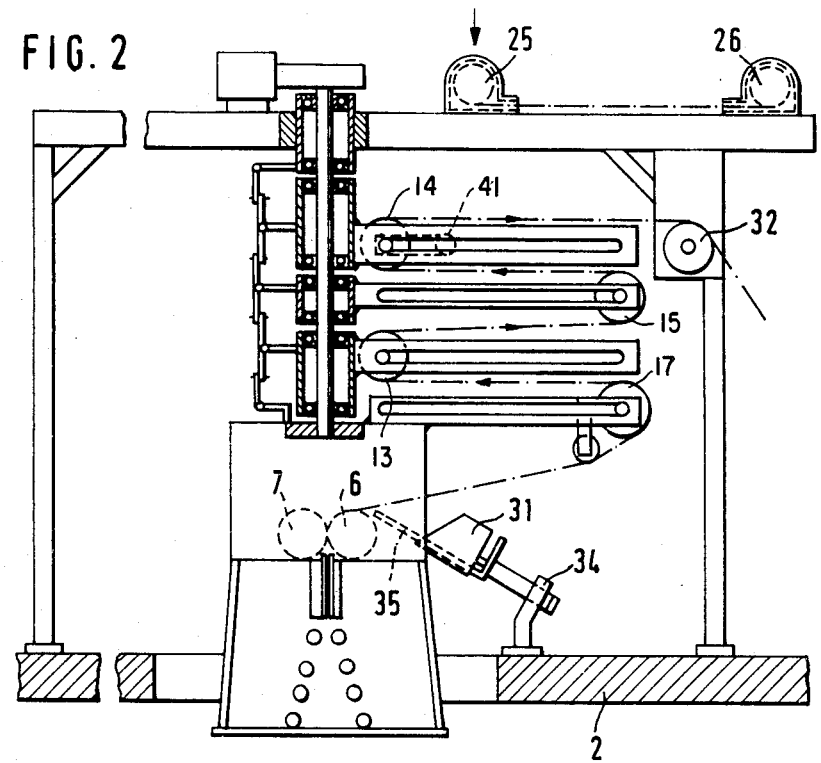
FIG. 2 is a view that is similar to FIG. 1 but showing the apparatus in an operating position.

Referring to FIGS. 1 and 2 of the drawings, a flattening and take-off apparatus is supported on a machine frame 1 secured to a false ceiling 2 of a factory building. That false ceiling 2 has an aperture 3 for receiving the frame 4 of a flattening apparatus 5. The flattening apparatus includes film flattening plates, between which a tubular film passes and is flattened from its original, substantially circular cross section, and is disposed above and is vertically axially aligned with an annular extrusion die of a film-blowing extruder (not shown). The frame 4 of the flattening apparatus 5, together with film squeeze rolls 6 and 7, are mounted to be pivotally movable together through about 360° about the axis 8 of the tubular film that issues from the extrusion die. That pivotal movement is imparted to the frame 4 and the squeeze rolls 6, 7 by means of a motor 9a, or or the like, operatively connected to a vertical shaft 9, which is also connected to the frame 4 of the flattening apparatus 5. Turning rods 13 and 14 are supported from supports 10 and 12, respectively, and a deflecting roller 15 is supported from a support 11. Each of supports 10, 11, and 12 is pivotally carried by shaft 9 and is suitably coupled to pivot relative to frame 4. An example of such a coupling mechanism is shown in U.S. Pat. No. 3,768,949, the disclosure of which is hereby incorporated herein by reference the same as it fully set forth. A deflecting roller 17 is carried by transversely extending arms 16, which are directly connected to and pivotally movable with frame 4.

The flattening and take-off apparatus shown in FIGS. 1 and 2 is generally similar to that described in U.S. Pat. No. 3,768,949, from which further details are apparent. The basic difference between the apparatus disclosed in U.S. Pat. No. 3,768,949 and the flattening and take-off apparatus shown in FIGS. 1 and 2 resides in that the supports 10, 11, and 12 and the frame 4 are each provided with transversely extending side arms 16, 18, 19, and 20, which have approximately the same transverse length, and the turning rods 13 and 14 and the deflecting rollers 15 and 17 are rotatably mounted in and extend between respective pairs of arms, only one of which is visible in FIGS. 1 and 2. Side arms 16, 18, 19, and 20 are formed with longitudinally extending rack grooves 21, 22, 23, and 24, respectively, in which mounting means including bearings for the reversing rollers 15 and 17, and mounting means, not including bearings, for the turning rods 13 and 14 are are longitudinally slidable. The turning rods 13 and 14 are non-rotatably supported in the associated mountings, whereas the deflecting rollers 15 and 17, on the other hand, are rotatably supported in their associated mountings.

Figure 4:
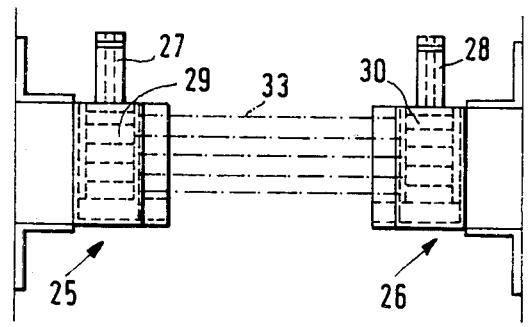
FIG. 4 is a top plan view showing a pair of reel magazines for the reels that include the threading tapes.

Two box-like magazines 25 and 26 are mounted in laterally spaced and substantially parallel relationship on a pair of transverse beams of the machine frame 1 above the turning rods and deflecting rollers. Referring to FIG. 4, a plurality of spools or reels 29, 30 are held in each of magazines 25, 26, respectively, on pins 27, 28, which can be retractable piston rods that are movable axially of magazines 25, 26. The magazine 25 is disposed with its longitudinal axis in a vertical plane that is positioned laterally between vertical planes passing through the axes of the turning rods and the deflecting rollers, and vertically above a hopperlike slide 31, which will be hereinafter described in more detail. Magazine 26 is disposed with its longitudinal axis in a vertical plane that lies laterally outwardly of a vertical plane that passes through the axes of feed rolls 32, which, in turn, are laterally outwardly of the turning rods and deflecting rollers, relative to axis 8. Only one feed roll 32 is shown. Interconnected threading tapes 33 extend between and are wound on respective ones of reels 29 and 30.

Figure 3:
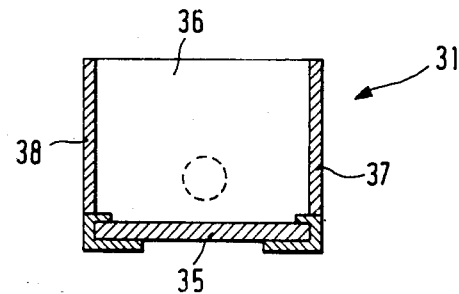
FIG. 3 is a transverse sectional view of a receiving hopper, which is slidably guided on a ramplike bottom plate.

Referring once again to FIG. 1, a support 34 is secured to the upper surface of false ceiling 2. A bottom plate 35 is secured to and extends from support 34, and, as shown in FIG. 1, is upwardly inclined toward and in the direction of movement of the film and toward the nip between squeeze rolls 6 and 7. As shown in detail in the cross-sectional view in FIG. 3, the hopperlike slide 31 is slidably mounted on the side edges of bottom plate 35 for movement therealong. The slide 31 includes a rear wall 36 and spaced side walls 37 and 38, and can be connected to a pneumatic cylinder (not shown) for movement thereof along bottom plate 35.

The bearings for squeeze roll 7 are laterally displaceably mounted so that a lateral gap between squeeze rolls 6 and 7 can be provided, as is shown in phantom in FIG. 1.

The elements of the apparatus are shown in the starting position in FIG. 1 and in the operating position in FIG. 2. For starting, the deflecting rollers 15 and 17 are moved inwardly toward axis 8 and along the track grooves 21 and 23, respectively, and the turning rods 13 and 14 are moved outwardly away from axis 8 and along the track grooves 22 and 24, respectively, to the positions shown in FIG. 1. The axes of the deflecting rollers are each spaced laterally inwardly toward axis 8 and the axes of the turning rods are each spaced laterally outwardly from axis 8 so that a transverse gap exists between the pair of deflecting rollers and the pair of turning rods. Squeeze roll 7 is then moved laterally outwardly from axis 8 and away from squeze roll 6 to provide a gap between the rolls 6 and 7 that is sufficiently large to permit a reel 29 to pass through the gap toward the extrusion die (not shown). When the apparatus has been moved to the position shown in FIG. 1, a reel 29 is dropped out of magazine 25 into the hopper-like slide 31, and the latter is then moved toward axis 8 to carry the reel to a position over the gap between squeeze rolls 6 and 7. The reel 29 is moved out of the slide and dropped through the gap between the squeeze rolls 6 and 7 so that the reel 29 is now disposed adjacent to the annular extrusion die (not shown) of the film-blowing extruder. The threading tape 33 carried on reel 29 is then joined to the leading end of the extruded tubular film in any suitable or conventional manner. The other reel 30 is dropped out of magazine 26 onto the false ceiling 2 to a position between the feed rolls 32 and the downstream winding apparatus (not shown) so that the threading tape 33 carried thereby overlies feed roll 32. The leading end of the extruded tubular film can now be fed through the flattening and take-off apparatus by pulling the threading tape 33 in the direction of the arrow 40 toward the winding apparatus (not shown). The tubular film is then threaded through the flattening and take-off apparatus, by carrying it between the flattening plates, between the squeeze rolls, through the transverse gap between the pair of deflecting rollers and the pair of turning rods, and over guide roll 41 and feed rolls 32. Turning rods 13 and 14 and deflecting rollers 15 and 17 are then displaced in opposite directions to each other, to their operating positions as shown in FIG. 2, and are suitably retained in their operating positions by suitable displacing means, such as, for example, hydraulic or pneumatic piston-cylinder units, or the like, which are suitably attached to the mounting means for the respective deflecting rollers and turning rods. Guide roll 41 is then pivoted to its inoperative position, out of contact with the tubular film, and is disposed between the side arms associated with turning rod 14, as shown in phantom in FIG. 2. When the apparatus is in condition for full operation and feeding of the tubular film, as shown in FIG. 2, the side arms that carry the turning rods 13 and 14 and the side arms that carry the deflecting rollers 15 and 17, all of which side arms are disposed one over the other in the starting position, can be pivotally moved relative to film axis 8, and the reversing drive can then be started.

Although particular embodiments of the invention have been illustrated and described, it will be apparent to those skilled in the art that various changes and modifications can be made without departing from the spirit of the present invention, and it is intended to encompass within the appended claims all such changes and modifications that fall within the scope of the present invention.

What is claimed is:

1. Apparatus for flattening and taking off blown continuous plastic tubular film that issues from a stationary film-blowing head, said apparatus comprising: a support frame; flattening plates and a pair of squeeze rolls supported from said frame and pivotally movable in mutually opposite senses through at least approximately 360 degrees about an axis of rotation along which a tubular blown film is supplied; at least two deflecting rollers for deflecting the tubular film through about 180° and at least two turning rods for deflecting the tubular film through about 180° and for effecting a simultaneous change in direction, said deflecting rollers and turning rods supported from said frame and disposed in alternation relative to each other between the squeeze rolls and a pair of rotatable feed rolls supported in the frame, said deflecting rollers and turning rods mounted on supports that are pivotally movable relative to each other about the axis of rotation of the flattening plates, wherein the axes of the deflecting rollers and of the turning rods are tangent to circles described about the axis of rotation of the flattening plates, said deflecting rolls disposed in operating positions radially outwardly of the turning rods relative to the axis of rotation of the flattening plates, the angles through which the axes of the deflecting rolls and the turning rods are pivotally movable decreasing as the distance from the feed rolls increases, wherein a tubular film can extend between and pass around the deflecting rollers and the turning rods and to said pair of rotatable feed rolls, and between successive deflecting rollers and turning rods the film lies in mutually parallel planes positioned substantially at right angles to the axis of rotation of the flattening plates; said deflecting roller and turning rod supports including respective pairs of parallel, spaced, transversely extending side arms having substantially equal lengths, the deflecting rollers and turning rods carried in and extending between respective pairs of side arms, said side arms each having track grooves extending therealong in inward and outward directions relative to said axis of rotation, and said deflecting rollers and turning rods each including respective mounting means movable along said track grooves and adapted to be retained in respective inner and outer positions along said track grooves.

2. Apparatus according to claim 1, including displacing means for displacing the deflecting rollers and the turning rods along the track grooves.

3. Apparatus according to claim 1, wherein an uppermost turning rod includes a pair of pivot levers axially spaced therealong, said pivot levers rotatably supporting a guide roller having an axis of rotation parallel with the axis of said turning rod.

4. Apparatus according to claim 1, wherein the frame supports first and second reels above the deflecting rollers and traversing rods, said first reel having its axis disposed in a vertical plane positioned between vertical planes passing through respective ends of said track grooves that receive the deflecting rollers and the traversing rods, and said second reel having its axis disposed in a vertical plane positioned outwardly of a vertical plane passing through the axis of the feed rolls and on the opposite side of the feed rolls from the deflecting rollers and the turning rods, said reels being detachably mounted for release from said frame, and threading tapes extending between and wound up on said reels to interconnect the reels.

5. Apparatus according to claim 4, including a pair of spaced magazines supported in said frame, each of said magazines carrying a plurality of said first reels and a plurality of said second reels, respectively.

6. Apparatus according to claim 4, including laterally movable squeeze roll supporting means for permitting one of said squeeze rolls to be moved laterally away from the other squeeze roll to define a gap therebetween.

7. Apparatus according to claim 4, including a slide carried on a plate extending toward the gap between the squeeze rolls and disposed vertically below said first reel, said slide movably carried on said plate for movement toward the gap between the squeeze rolls and adapted to receive a first reel for conveyance toward the gap.

8. Apparatus according to claim 7, wherein the slide includes side walls to define a receiving hopper.

* * * * *